(12) United States Patent
Kimball

(10) Patent No.: US 6,213,781 B1
(45) Date of Patent: Apr. 10, 2001

(54) EDUCATIONAL GAME USING SELECTIVE LIGHT DISPLACEMENT TO TEACH PHYSICAL CONCEPTS

(75) Inventor: Nathan Kimball, Newton Corner, MA (US)

(73) Assignee: Technical Education Research Centers, Inc., Cambridge, MA (US)

( * ) Notice: Subject to any disclaimer, the term of this patent is extended or adjusted under 35 U.S.C. 154(b) by 0 days.

(21) Appl. No.: 09/439,553

(22) Filed: Nov. 12, 1999

Related U.S. Application Data

(63) Continuation of application No. 08/861,529, filed on May 22, 1997, now abandoned.
(60) Provisional application No. 60/018,190, filed on May 23, 1996.

(51) Int. Cl.[7] ............ G09B 23/06; G09B 19/00; A63B 67/00; A63B 71/00
(52) U.S. Cl. ............ 434/300; 434/255; 482/3; 273/440; 273/454
(58) Field of Search ............ 434/21, 42, 240, 434/255, 276, 300, 302, 305, 324, 325, 337, 247, 365; 482/3; 119/702, 707; 273/440, 445, 446, 454; 463/6, 58, 59

(56) References Cited

U.S. PATENT DOCUMENTS

| | | |
|---|---|---|
| 1,824,572 | 9/1931 | Roberts . |
| 2,457,968 | 1/1949 | Allen et al. . |
| 3,544,959 | 12/1970 | Hawks . |
| 3,846,704 | 11/1974 | Bessette . |
| 3,872,423 | 3/1975 | Yeakley . |
| 3,933,354 | 1/1976 | Goldfarb et al. . |
| 3,944,796 | 3/1976 | Fitzpatrick . |
| 4,028,693 | 6/1977 | Kuntz . |
| 4,070,016 | 1/1978 | Dumas . |
| 4,482,325 | 11/1984 | Reimann . |
| 4,834,375 | 5/1989 | Elstein et al. . |
| 4,974,833 | 12/1990 | Hartman et al. . |
| 5,376,053 | 12/1994 | Ponder et al. . |
| 5,417,573 | 5/1995 | Cassiere, II et al. . |
| 5,451,922 | 9/1995 | Hamilton . |

OTHER PUBLICATIONS

Sampson, Barbara C., "HANDS ON!", *Terc*, Spring 1995, vol. 18, No. 1, pp. 1–23.

*Primary Examiner*—Joe H. Cheng
(74) *Attorney, Agent, or Firm*—Bromberg & Sunstein LLP

(57) ABSTRACT

An educational game is disclosed which uses a series of illumination devices which are sequentially illuminated to illustrate to a user a velocity. The user selectively chooses the velocity at which the illumination devices are sequenced and therefore can race against the sequence of illumination devices or monitor same. In either event, the sequence of illumination devices having been illuminated at the selected speed, allowing the user to interact, using mind and body with the phenomenon of speed allowing the user to experiment with concepts of speed and velocity. A further embodiment is shown wherein a series of audible devices in conjunction with the illumination devices are selectively actuated to illustrate to the user the velocity.

26 Claims, 6 Drawing Sheets

EDUCATIONAL GAME USING SELECTIVE LIGHT DISPLACEMENT TO TEACH PHYSICAL CONCEPTS

CROSS REFERENCE

This application is a continuation of Ser. No. 08/861,529 filed May 22, 1997, now abandoned, which was based on provisional application 60/018,190 filed May 23, 1996. These applications are herein incorporated by reference.

BACKGROUND OF THE INVENTION

The present invention relates generally to educational games. More particularly, the invention relates to educational games that teach children about physical concepts such as speed and relative velocity.

Commercially available educational games have been used in various settings to teach a wide variety of information and concepts. Various board games, for example, use trivia or directed questions to educate users on various topics. Physical concepts such as gravity and velocity, are not readily amenable to such methods of teaching. Textual presentation of such concepts lack the environmental interaction that can provide a student a conceptual link that demonstrative presentation can give. Further, reading or listening to an explanation of a concept requires the student to perform the potentially difficult task of digesting the text into a form that has meaning to that student.

Some toys take a step toward teaching some physical concepts. Teaching speed and velocity, for example, are taught by introducing a relative motion with respect to the user. An example of such a toy is a car race track. The user then controls the speed of the car over the track thereby investigating and learning in an abstract sense the concepts of speed and acceleration. A problem with such toys is that the speed of the car is not known or given in absolute terms, and its context is always the same. Its scale is small, and does not allow the user to participate physically in the motion of the car to get a deep physical sense of speed and its consequences of covering a perceptible distance over time.

Currently available full size toys and games have not been used to teach such physical concepts. Examples of such games and toys are found on an average playground. A swing set, for example, can be used to introduce a relative motion to a user where the user oscillates with respect to the earth. The speed of the user is not easily gauged nor can it be controlled beyond the rudimentary manual control of the user. Therefore, the user has no way to ascertain speed against a controlled speed in order to learn the physical concept.

Accordingly, it is an object of this invention to provide a game that teaches physical concepts such as speed and velocity.

It is another object to the invention to provide a game that is fully scaled such that motion within the game can be accurately applied to the user.

It is still another object of the invention to portray velocity, or other physical concepts, in such a way that the user can investigate the concepts in a playful way singularly or in groups.

These and other objects of the invention will be obvious and will appear hereinafter.

SUMMARY OF THE INVENTION

The aforementioned and other objects achieved by the invention which provide, in one aspect, a game for teaching physical concepts. The game comprises a housing, signaling means and control means.

The housing is elongate and is disposed alongside a track. In the preferred embodiment, the track and the housing are linear, and the housing extends for a length of the track.

The signaling means is disposed on the housing for indicating an active point on the housing substantially parallel to the track. The signaling means can consist of visual and/or auditory signals, such as a plurality of illuminating devices, such as incandescent lights, and a plurality of audible devices, such as bells. Each of the illumination devices and auditory devices are disposed in a spaced apart relationship along the housing substantially parallel to the track spanning from a beginning point of the track to an end point of the track. An example of such an arrangement is placing incandescent lights together with the bells, every one-half meter from the beginning of a twenty-five meter track to the end of the track. The simultaneous flashing of any incandescent light and ringing of a spatially related bell, gives the impression of actual motion.

The control means is electrically connected to the signaling means and has a control panel disposed thereon. The control panel comprises a gauge marked in meters per second for adjusting the speed at which the signaling means displaces the active point on the housing relative to the track. In other words, when an operator of the controls means adjusts the gauge such that it is set for five meters per second and the signaling means contains a plurality of illuminating devices, then the lights on the signaling means would then be selectively displaced at a rate of five meters per second. In this way if a person chooses a specific rate such as five meters per second, then the user can visually monitor the displacement and perceive a true representation of that rate. The user can dynamically adjust the displacement once the signaling means has started. Thereby, the user perceives the concept of acceleration. Alternatively, the user can delay the beginning of the displacement or have a separate operator start the signaling means, which allows the user to walk or run on the track and to compare their speed to the known rate of displacement. Thus, the comparison further teaches the aforementioned physical concepts by the kinesthetic involvement of the user.

The game is interactive, in that, a user can be positioned on the track while an operator is governing the control means. The control means are adjustable during use, so as to slow down or speed up the rate at which the signaling on the housing is displaced or even reverse the direction at which the signaling or the housing is displaced. The adjustability allows the operator to interact with the game and fool the user.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of educational devices and may be embodied in several different forms it is advantageously employed in connection with playground equipment. Though this is the form of the preferred embodiment and will be described as such, this embodiment should be considered illustrative and not restrictive.

Figure 1:
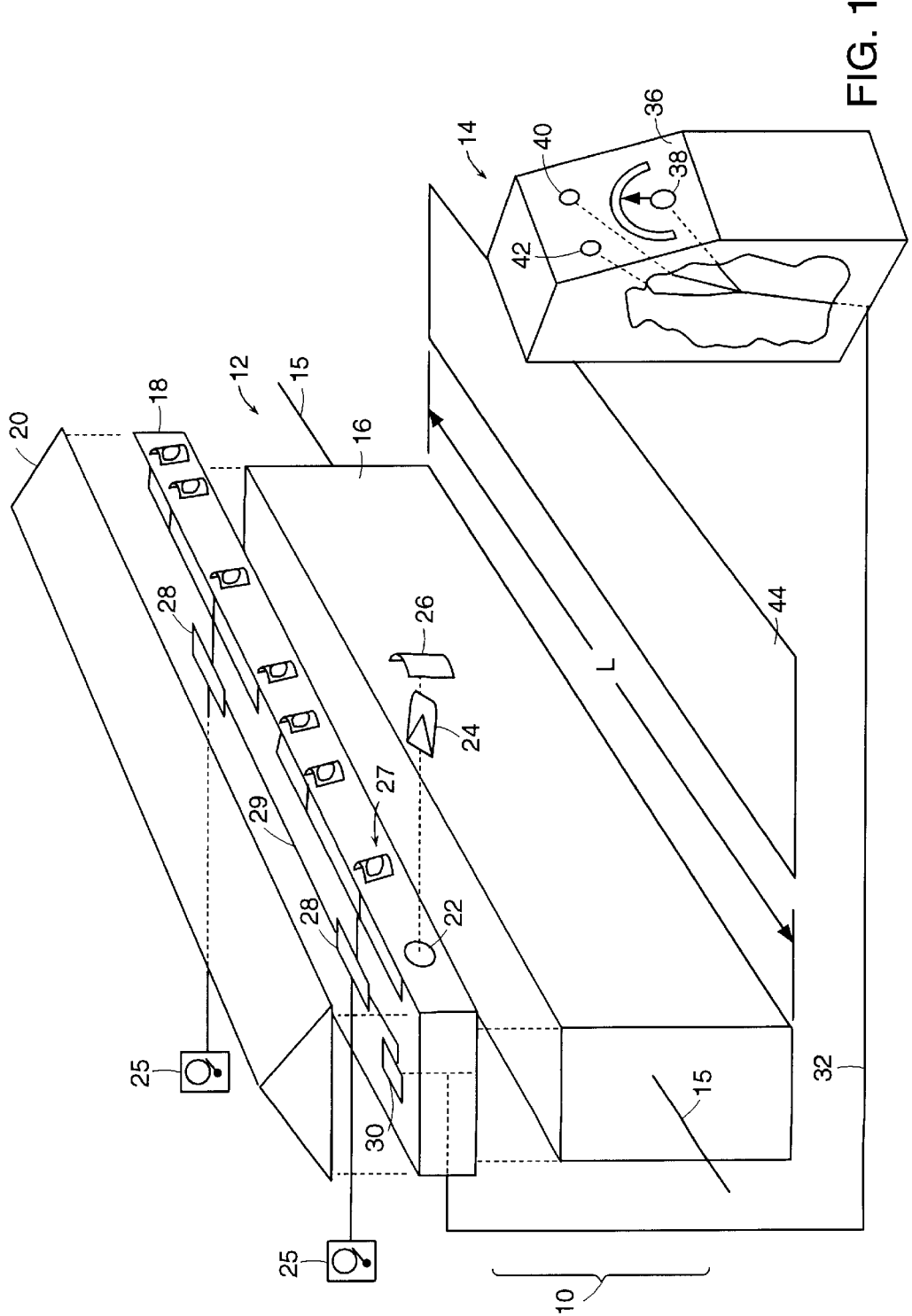
FIG. 1 shows an exploded perspective view of the educational game of the invention.

Referring to FIG. 1, there is shown an educational game 10 of the invention. The educational game 10 comprises a housing 12 disposed proximal to a track 44 and a controller 14 disposed remotely with respect to the housing 12.

The housing 12 is generally elongate along a central axis 15 which is substantially parallel to the track 44. In the preferred embodiment, the housing 12 is fabricated from three or more separate pieces. The first piece is a base 16. The base 16 supports a electrical enclosure 18 along a length of the housing 12. The electrical enclosure 18, in turn, supports a top 20.

The base 16 is generally fabricated as either a hollow module having solid lateral surfaces or a series of individual supports. In either case, the base 16 serves a purpose of providing mechanical support for the electrical enclosure 18. The base 16 is not required for operation of the educational game 10, but the base 16 is used to elevate the electrical enclosure 18 to an approximate eye or chest level of an average user to facilitate use of the educational game 10.

The top 20 is optional and, when used, is secured atop the electrical enclosure 18. The top 20 can be used for functional or ornamental purposes, or both. In the illustrated embodiment, the top 20 has a triangular cross-section and is elongate along the length of the housing 12. The triangular shape of the top 20 is used to dissuade children from climbing on the housing 12.

The electrical enclosure 18 is generally hollow and fully enclosed. The electrical enclosure 18 provides an enclosure for the electronic and electrical components of the educational game 10. The electrical enclosure 18 is preferably fabricated to be weather resistant, thereby, inhibiting water penetration to the electrical components.

Electrical enclosure 18 has substantially solid lateral surfaces that are bored at fixed intervals with apertures 22. The apertures 22 are dimensioned to fit lights 24 which, in turn, are each covered by lens covers 26. In the illustrated embodiment, the lights 24 are incandescent bulbs and, therefore, the lens covers 26 provide protection to the lights 24 from both mechanical contact and environmental elements. Together each one of the lights 24 and the lens covers 26 combine to form individual light fixtures 27. One skilled in the art will realize that any of various light sources can be used to illuminate the housing 12 at fixed intervals.

A series of light fixtures 27 are disposed on the lateral surface of the electrical enclosure 18 as described. For example, in the preferred embodiment the housing 12 is elongate to a length, L, of twenty-four meters and the light fixtures 27 are disposed along the length L of the housing 12 at approximately every one-half meter. Thus, in the preferred embodiment there are 48 light fixtures 27.

The light fixtures 27 are shown in FIG. 1 grouped into two sets of 4 light fixtures 27 where each of the two groups are controlled by a group board 28. The group board 28 responds to digital commands carried by the signal bus 29 to actuate individual light fixtures 27 under the control of the group board 28 by switching power in sequence to the individual light fixtures 27 under the control of the individual group board 28.

In the preferred embodiment auditory devices such as bells 25, also receive commands from the group board 28. As such, one of the auditory devices, bells 25, is attached to the group board 28, hence there is one bell for every four lights 24. Thus, as the lights flash, the bell associated with the group board rings in synchrony with the lights. In the preferred embodiment, the auditory devices and the illumination devices together comprise the signaling device that indicates an active point on the housing 12. It should be obvious to those skilled in the art that the illumination devices or the auditory devices can alone constitute the signaling device. In addition, other implementations of the signaling device, such as "flip-disk" technology, for example, can be used alone or in conjunction with auditory devices without departing from the scope of this invention.

A driver board 30 controls each group board 28. Upon receiving a 'go' command signal over the command line 32 the driver board 30 sequentially actuates each group board 28 which, in turn, sequentially actuate the lights 24 and the bells 25. The driver board 30 then polls the controller 14 for a user's speed setting over the command line 32. The driver board 30, in turn, addresses one of the lights 24 such that the group board 28 associated with the individual lights 24 will actuate the individual lights 24, and sound the associated one of the bells 25.

Addressing is accomplished using standard digital addressing schemes well known in the art. For example, in the preferred embodiment a digital system is used to address the eight lights 24. Since there are eight lights 24, a 3-bit system, i.e., $2^3$ bits, is used such that the first of the lights 24 would be addressed as 000. The second of the lights 24 would be addressed as 001, et cetera, until the last of the lights 24 that would be addressed as 111. In this example, the most significant bit selects the group board 28, and the less significant bits select the individual lights 24 attached to that group board 28.

The command signals being passed over the command line 32 are polled by the driver board 28. It should be obvious to those skilled in the art that a control board could also be disposed in the controller 14 to notify the driver board 30 in lieu of the polling technology without departing from the scope of this invention. Then, the driver board 30 reads the status of the individual controls disposed on the controller 14 to compute the logical sequence of the lighting and sounds as previously described.

Disposed on the controller 14 is a control panel 36 having a speed gauge 38 located thereon. In the preferred embodiment, the speed gauge 38 is an analog gauge calibrated in meters per second and having a positive and negative direction indicating motion away and toward the controller 14, respectively. In this illustration, there is shown two buttons 40, 42 on the control panel 36 which indicate a start position. A near start button 42 indicates that the lights 24 and the bells 25 should begin illumination on an end proximal to the controller 14 and a far start button 40 indicates that the lights 24 and the bells 25 should begin at a distal end of the housing 12.

An operator of the controller 14 sets the speed gauge 38 to a desired position and presses one of the two start buttons 40, 42. The driver board 30 analyzes the speed, start position and direction on the individual controls on the control panel 36 and sends address information over the command line 28 indicative of the lights 24 to be illuminated and the bells 25 to be sounded.

In the preferred embodiment, the speed gauge 38 is a potentiometer that has a range of movement from 0 to 180 degrees. The potentiometer serves as a voltage divider thereby producing a voltage across the potentiometer that changes proportionally to an amount of rotation to the potentiometer. The output voltage is, therefore, reflective of a speed setting of the speed gauge 38.

In the preferred embodiment, the speed gauge 38 is logically divided into three ranges such that direction can be altered by an operator. A negative direction is indicated by movement of the speed gauge 38 within the range of 0 to 88 degrees and positive direction is indicated by rotation of the speed gauge 38 between 92 and 180 degrees. The range from 88 to 92 degrees denotes a zero speed.

Upon actuation of one of the start buttons 40, 42 the driver board 30 determines a speed, a direction and a starting position from the controls on the control panel 36. In the preferred embodiment the driver board 30 includes a PIC microprocessor operating at approximately 4 megahertz. The microprocessor determines the rate of speed, direction and starting position, and transmits over the command line 32 a command signal which digitally represents (or addresses) which of the lights 24 will be illuminated and bells 25 will be sounded. The driver board 30 then sequentially updates the address periodically according to the controls on the control panel such that lights 24 on housing 12 are sequentially illuminated and the bells 25 on the housing are sequentially sounded.

It should be obvious to those skilled in the art that the control panel 14 could be implemented by various user interfaces such as a computer interface, for example, without departing from the scope of the invention.

In operation, the educational game 10 enhances cognitive appreciation of physical concepts by illustrating to the user in real time various motion-related physical concepts. Velocity, for example, is a vector quantity whose magnitude is a body's speed and whose direction is the body's direction of motion. The educational game 10, therefore, is illustrative of a body's speed by demonstrating to the user in real time a selected velocity. Further, the user can further determine personal relationships and kinesthetic understanding with respect to selected velocities by racing against the lights 24 which sequentially illuminate at a fixed and known rate.

Speed is a measure of the rate of motion, or the magnitude of a velocity. By utilizing the directional components of the controller 14, the velocity can be made negative while the speed increases as an absolute value of velocity, thus teaching the user the physical concept of speed.

By dynamically changing the speed of the illumination of the lights 24, acceleration can be taught. Acceleration is the rate of change of velocity with respect to time. Therefore, if a user changes the velocity at a substantially constant rate, the concept of acceleration is demonstrated. One skilled in the art will realize that various other physical concepts can be demonstrated and taught by the invention. The invention invites experimentation with all physical variables associated with motion, such as velocity, distance and time.

Figure 2:
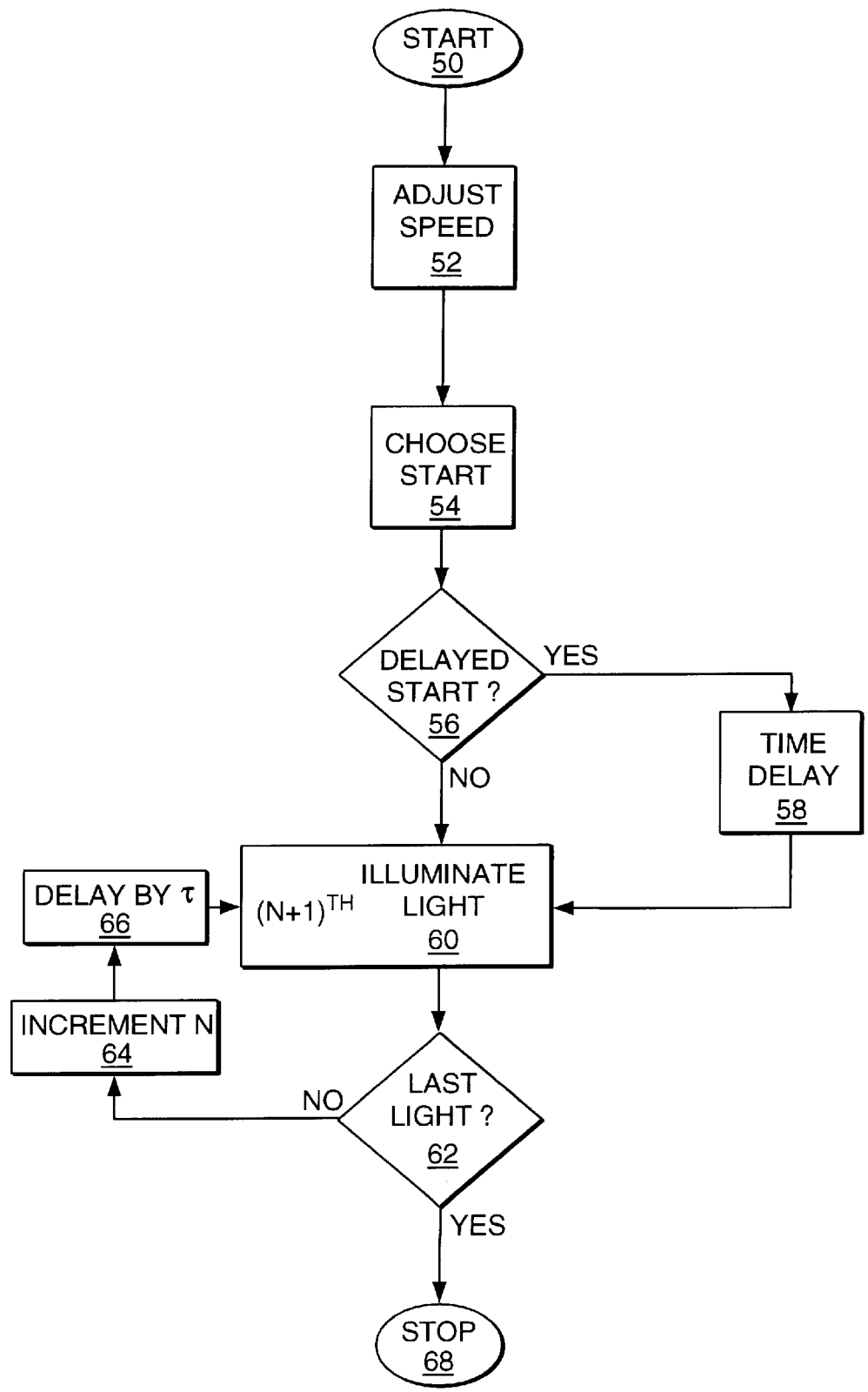
FIG. 2 shows a flow chart of the decision making process used by the control means of the educational game of FIG. 1.
Figure 3:
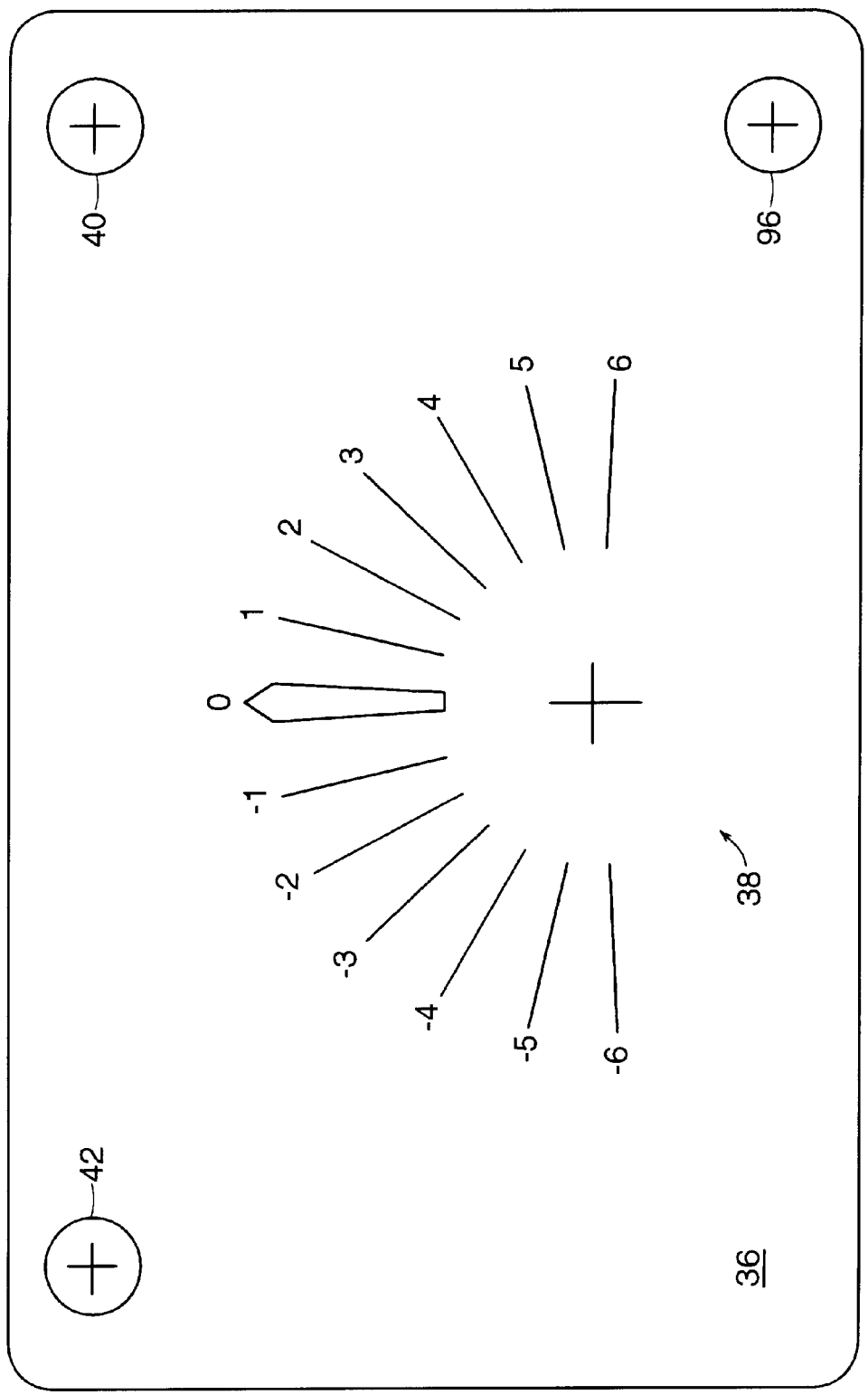
FIG. 3 shows an illustration of a control panel used in the educational game of FIG. 1.

Referring now to FIGS. 2 and 3, the operation of one embodiment of the educational game 10 is further illustrated where the signaling device of this embodiment contains only the illumination devices. As power is supplied to the educational game 10, the process has essentially started 50. An operator of the controller 14 then adjusts the speed 52 to a desired speed v. The speed is adjusted 52 and a value of a delay time $\tau$ is thus chosen, where the delay time $\tau$ is based on the desired speed v and the distance the lights 24 are spaced apart. One of the start buttons 40, 42 is then selected 54. If operator is also going to be the user, i.e., the operator chooses to go over to the track 44 and race against the sequence of lights 24, then a delayed start can also be chosen 56. If a delayed start is chosen 56, then the countdown timer is used 58 to delay the start of the sequence. If delayed start is not chosen 56, or the time delay 58 expires, then the lights 24 are sequentially illuminated 60 where the first of the lights 24 is designated by n and each subsequent one of the lights 24 would be the n plus one. It should be obvious that if the value of v is negative, the first of the lights 24 would be designated by n and each subsequent one of the lights 24 would be n minus 1.

Once the illumination sequence is begun, a loop is used to periodically update the area on the housing 12 which is illuminated. In doing so, it is first determined whether the last of the lights 24 in the sequence has been lit 62. If it has not, then the number n indicating the current address of the individually illuminated lights 24 is incremented 64. The delay time $\tau$ is then used to regulate the periodicity of the illumination of the next subsequent light 66. The next subsequent light 66 is then illuminated 60 and the process is repeated until the last of the lights 24 is illuminated, the process then stops 68.

Figure 4:
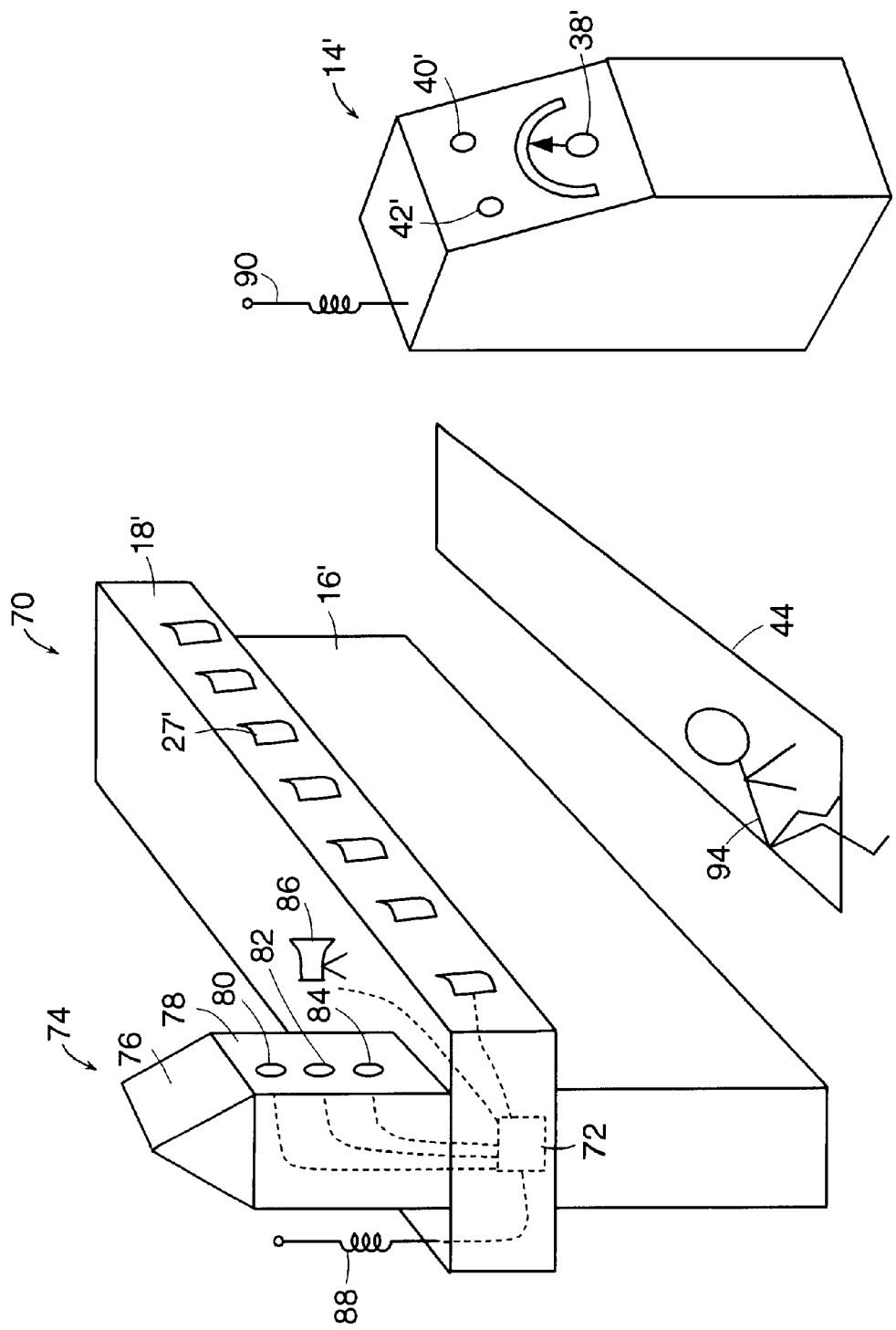
FIG. 4 shows a perspective view of an alternative embodiment of the educational game of FIG. 1 having start lights and audio.

FIG. 4 illustrates additional embodiment of the invention where like numerals designated previously describe the elements, there is shown a second embodiment of the educational game. In contrast to the first embodiment, the housing 70 does not include the top 20. Therefore, the housing 70 has a flat top surface of electronic housing 18'. In this embodiment there is shown a start signal housing 74 having a triangular top 76 to inhibit children from climbing and a substantially rectangular housing 78.

The housing 78 has start lights 80, 82, 84 disposed thereon. The start lights 80, 82, 84 are colored in a similar fashion to that of traffic signals where a red light 80 is disposed over a yellow light 82 which in turn is disposed over a green light 84. The start lights 80, 82 and 84 are indicative of a start procedure, which signals the user 94 that the light sequence will soon begin. Additionally, in this embodiment there is audible notification such as a speaker 86 which presents audible indications of the start sequence in addition to the movement of the start lights, 80, 82 and 84.

As previously described the controller 14' sets the speed, direction and position of start for the user 94. This embodiment in FIG. 4 is shown an antenna 90 for communicating previously described command signals to another antenna 88 which passes the command signals to driver board 72. Command signals are transmitted in a format similar to that previously described, except in this embodiment the command signals are encoded on a radio frequency transmission or other such wireless communication, such as infrared for example. The driver board 72 operates in a similar manner to that of the previously described driver board in that it interprets the command signals received on the antenna, 88 and drives the individual light fixtures 27' as well as the start lights, 80, 82, 84 and the speaker 86.

Figure 5:
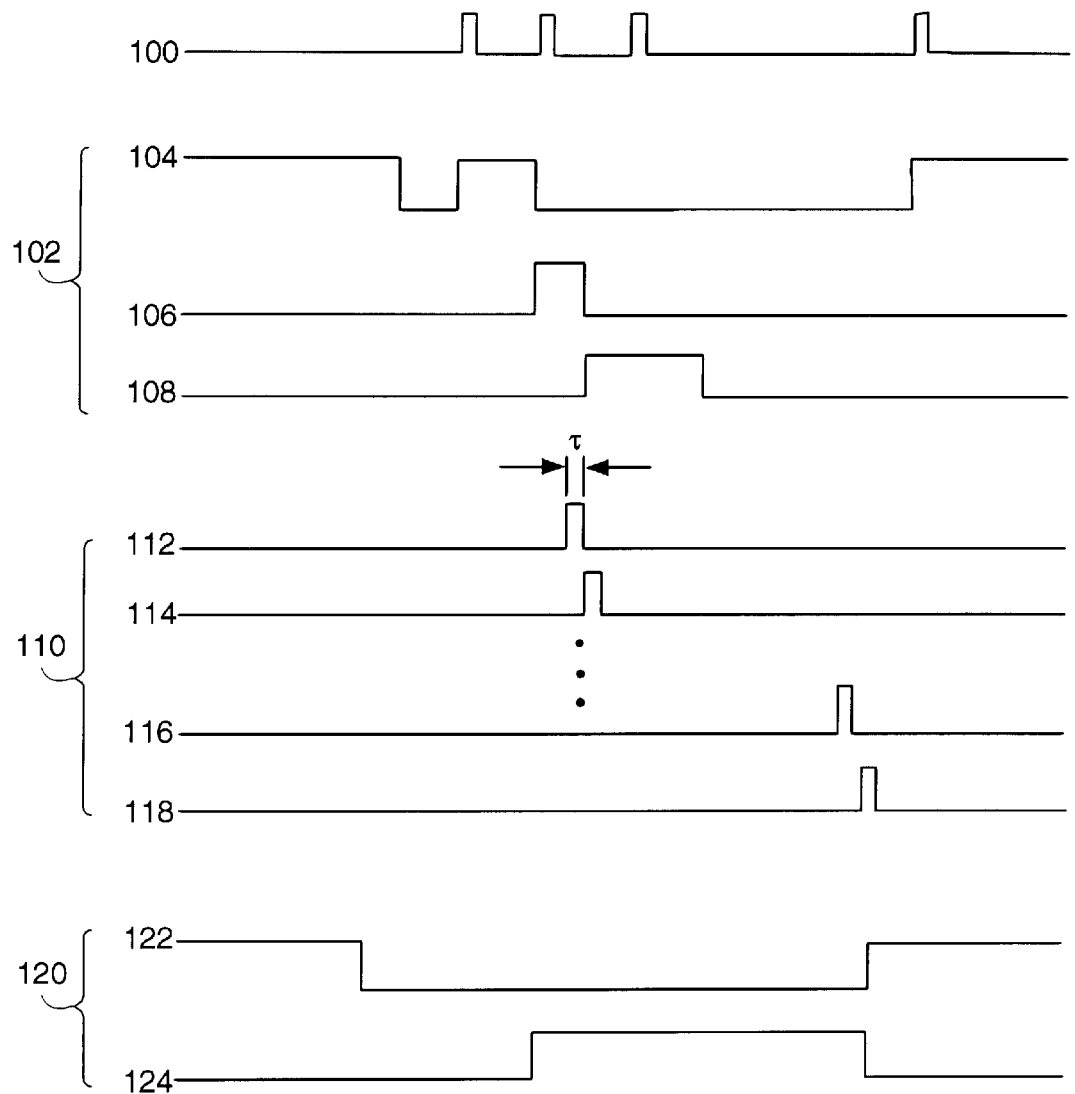
FIG. 5 shows a series of timing diagrams for the educational game of FIG. 4.

FIG. 5 shows a series of timing diagrams that are illustrative of how the system described in FIG. 4 operates in practice. The timing diagrams illustrate a standard use of the educational game where a near start and a positive direction are chosen and there are no speed changes or direction changes dictated by the controller 14' during operation of the educational game. That is, an operator of the controller, assuming there is a separate operator from the user 94, does not alter the controls 18' while the user 94 is racing against the sequence of lights on the housing 70.

Speaker signal 100 illustrates the electrical signal sent to the speaker 86.

Following the speaker signal 100 are start light signals 102 indicative of the start lights 80, 82 and 84 where signal 104 is for the red light 80, signal 106 is for the yellow light 82 and signal 108 is for the green light 108. It can be seen that the red light 80 is normally on, and momentarily flashes off such that all of the start lights 80, 82 and 84 are off to indicate the beginning of a start sequence. The red light 80 then goes on and a pulse is then sent to the speaker 86 which emits an audible sound indicative of the beginning of the start sequence.

At that time additional lights, not shown in the drawing, which are located at the far end of the housing are cycled. The additional lights are indicated by two signals 122 and 124 where the signal 122 is for the additional red light and the signal 124 is for the additional green light. The red light goes to an "off" position when the start sequence begins. The green light goes to an "on" position at the end of the start sequence. Thus, the start signals 80, 82 and 84 can indicate a start sequence. For a short period the red light signal 104 goes to off. A pulse on the sound signal 100 is transmitted to the speaker 86 which again chirps indicating a transition in light. The yellow light signal 106 goes positive turning the yellow light 82 on.

Subsequently, the yellow light 82 goes off and the green light signal 108 goes positive turning the green light 84 on and another chirp is sent through the speaker 86. At that time the end green light signal 122 goes positive, while the light fixtures 27 sequentially turn on.

The fixture signals 110 are shown as sequentially illuminating where a first light fixture signal 112 goes on for a period of time dictated by the previously described speed control which dictates the time τ. Once the on time for the first light fixture signal 112 has expired, the light fixture signal 112 goes off thereby shutting the first light fixture off and the second light fixture signal 114 goes on tuning the second light fixture on. This precedes through the sequence of light fixtures until the penultimate light fixture signal 116 goes on, followed by the last light fixture signal 118 going on and transitioning to off.

Once the last light fixture signal 118 goes off, the red light signals 104 and, 122 transition to an on state and the distal end green light signal 122 goes off. This makes both red lights turn on.

Figure 6:
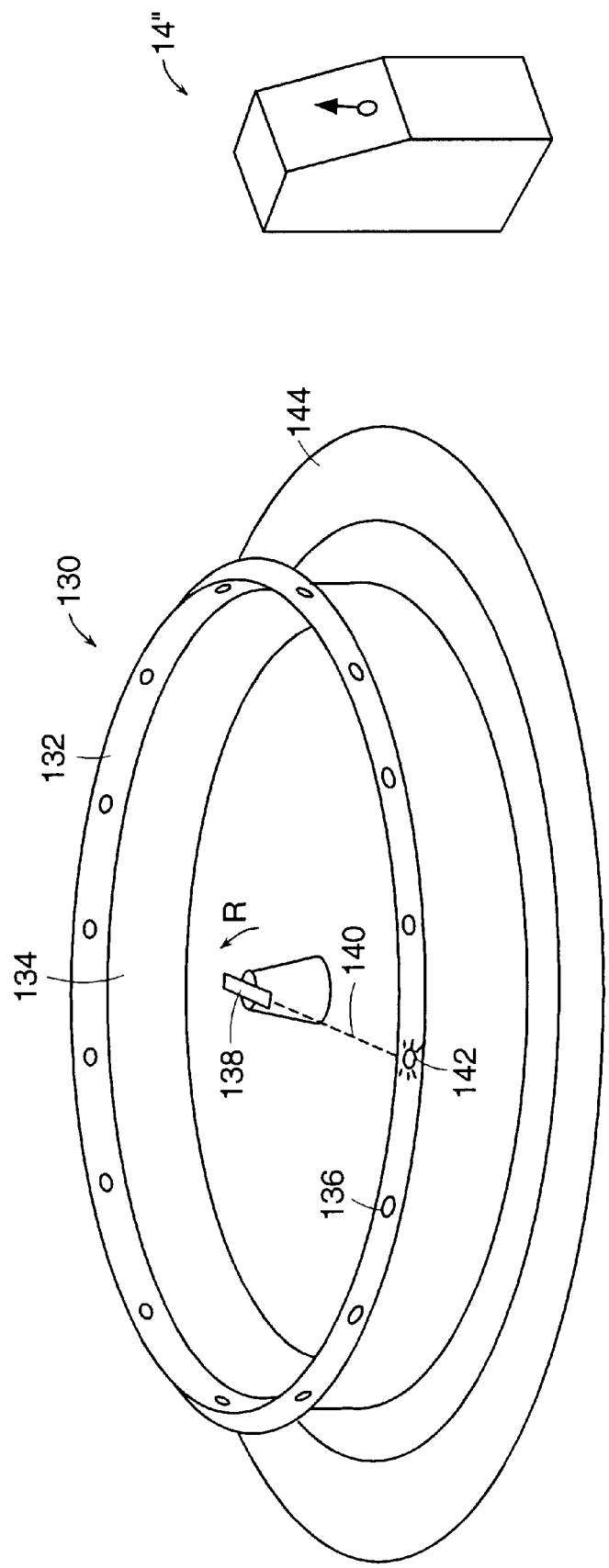
FIG. 6 shows an alternative embodiment of the invention where the educational game is circularly disposed.

Referring now to FIG. 6 an additional embodiment of the invention is shown where the educational game 130 is arranged non-linearly. The previous embodiments have each described linear embodiments with a linear track corresponding thereto. This embodiment also does not have auditory signals. Additionally, incandescent or other standard forms of illumination have been described. In this embodiment the educational game 130 is disposed in a oval shape where a track 144 is oriented around the educational game 130 in a similar oval shape.

In this embodiment the electrical housing, 132 is disposed on a oval shape base 134 and has a plurality of light fixtures 136 disposed a fix periodic relationship to each other about the oval.

As before, the illumination of the light fixture 136 is controlled by a controller 14". In contrast to the previous embodiment, the illumination in this embodiment is achieved by a laser 138 which is rotationally disposed in a center position of the oval such that it can be driven in 360 degrees of rotation along the path R. The speed of rotation along the path R is controlled by the controller 14" such that the sequential illumination of the light fixtures 136 by the laser 138 correspond to the velocity chosen on the controller 14". That is, when the laser 138 projects a bean 140 to a light fixture 142 causing the light fixture 142 to illuminate, the rotational velocity of the laser 138 will illuminate the light fixture 142 at a rate corresponding to the velocity on the controller 14". In this embodiment the light fixture 142 lacks individual electronics or illumination devices but is presented with a lens having a phosphorescent film which phosphoresces in response to the beam 140.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An educational game for learning the relationships between the physical variables of motion, including time, displacement, linear velocity and linear acceleration through control, display, and interaction with these variables comprising:

a housing, the housing having a plurality of lighting elements arranged at fixed positions to define a path of motion;

a control panel in electrical communication with the lighting elements; and a gauge disposed upon the control panel wherein the gauge permits the rate of illumination of the lighting elements to be altered while the game is in use;

wherein the lighting elements sequentially illuminate to give the appearance of motion along the defined path of motion.

2. An educational game according to claim 1, wherein the gauge is calibrated such that the gauge reflects the rate at which the lighting elements are illuminated.

3. An educational game according to claim 1, further comprising a track disposed proximally to the housing.

4. An educational game according to claim 1, wherein the lighting elements are incandescent lights.

5. An educational game according to claim 1, wherein the lighting elements are protected by transparent or translucent shields.

6. An educational game for demonstrating physical concepts to a user, the educational game comprising:

a housing;

a plurality of signaling elements disposed on the housing wherein each of the plurality of signaling elements is adapted to indicate an active point on the housing;

control means in electrical communication with the plurality of signaling elements and having a user interface for selectively actuating one or more of the plurality of signaling elements at a rate dictated by the user through the user interface, thus demonstrating physical concepts to the user; and a laser for projecting a beam of light sequentially onto each of the plurality of signaling elements.

7. An educational game according to claim 6, wherein the plurality of signaling elements is coated with a phosphorescent film such that the laser beam causes the phosphorescent film to phosphoresce.

8. An educational game according to claim 6, further comprising a track disposed proximally to the housing.

9. An educational game according to any of claims 1 or 6, wherein the housing has a rectangular cross section.

10. An educational game according to any of claims 1 or 6, wherein the housing is oval.

11. An educational game according to any of claims 1 or 6, further comprising a top section disposed on the housing, the top section having a triangular cross section to dissuade children from climbing on the housing.

12. An educational game for learning the relationships between the physical variables of motion, including time, displacement, linear velocity, and linear acceleration through control, display, and interaction with these variables comprising:

a housing, the housing having a plurality of lighting elements arranged at fixed positions to define a path of motion;

a control panel in electrical communication with the lighting elements;

a gauge disposed upon the control panel, wherein the gauge permits the rate of illumination of the lighting elements to be altered while the game is in use; and a plurality of auditory devices in electrical communication with the control panel such that they may be activated in synchronization with the lighting elements.

13. An educational game according to claim 12, wherein the auditory devices are bells.

14. An educational game according to any of claims 1 or 12, wherein the gauge is a potentiometer, the potentiometer having a dial such that the dial may be rotated through an angle of at least 180 degrees.

15. An educational game according to any of claims 1, 6, or 12, further comprising:

a top section disposed on the housing, the top section having a parabolic cross section to dissuade children from climbing on the housing.

16. An educational game according to any of claims 1, 6, or 12, wherein the housing has a central horizontal axis, and further comprising:

at least one tower, the tower having a central vertical axis and at least two apertures disposed along the vertical axis, the housing and the tower arranged such that the vertical axis of the tower is perpendicular to the central horizontal axis of the housing;

lighting elements in electrical communication with the control panel and disposed within the apertures;

colored shields for the lighting elements; and at least one start button disposed on the control panel, the start button being in electrical communication with the lighting elements.

17. An educational game according to claim 16, wherein the tower has three apertures each containing a lighting element and a red, yellow or green shield such that the apertures, lighting elements, and shields form a traffic light configuration.

18. An educational game according to claim 16, further comprising a track disposed proximally to the housing.

19. An educational game for learning the relationships between the physical variables of motion, including time, displacement, linear velocity, and linear acceleration through control, display and interaction with these variables comprising:

a housing, the housing having a plurality of lighting elements arranged at fixed positions to define a path of motion and a plurality of auditory devices in electrical communication with the lighting elements;

a control panel in electrical communication with the lighting elements and auditory devices;

a gauge disposed upon the control panel, wherein the gauge permits the rate of illumination of the lighting elements and synchronous activation of the auditory devices to be altered while the game is in use; and a track disposed proximally to the housing whereby a user may experience the rate of illumination of the lighting elements by moving along the track in step with the sound produced by the auditory devices.

20. A method for learning the relationships between the physical variables of motion, including time, displacement, linear velocity, and linear acceleration through direct physical experience comprising:

providing a housing having a plurality of lighting elements arranged at fixed positions to define path of motion and a control panel in electrical communication with the housing, the control panel having a gauge by which the lighting elements are sequentially illuminated to give the appearance of motion along the path at a rate chosen by a user, the gauge being calibrated to reflect the rate by which the lighting elements are illuminated; and using the gauge to alter the rate of illumination of the lighting elements such that the user observes different rates of illumination and accelerated rates of illumination.

21. A method according to claim 20, wherein the gauge is a potentiometer, the potentiometer having a dial such that the dial may be rotated through an angle of at least 180 degrees such that the rate of illumination is altered by turning the gauge.

22. A method according to claim 21, further comprising disposing a track proximal to the housing whereby a user may get a physical sense of the velocity or acceleration he chooses by running along the track and trying to keep pace with the rate of illumination of the lighting elements.

23. A method according to claim 21, further comprising activating a plurality of auditory devices, the auditory devices being in electrical communication with the control panel and being activated in synchronization with the lighting elements such that a user may experience the rate he chooses by moving along the track in step with the sound produced by the auditory devices.

24. A method according to claim 23, wherein the auditory devices are bells.

25. A method according to claim 21, wherein the lighting elements are coated with phosphorescent film and further comprising:

projecting a laser beam sequentially onto each of the plurality of lighting elements to cause them to phosphoresce at a rate chosen by a user.

26. A method for learning the relationships between the physical variables of motion, including time, displacement, linear velocity, and linear acceleration comprising:

providing a housing having a plurality of lighting elements arranged at fixed positions to define a path of motion and a control panel in electrical communication with the housing, the control panel having a gauge by which the lighting elements are sequentially illuminated to give the appearance of motion along the path of motion at a rate chosen by a first user, the gauge being calibrated to reflect the rate by which the lighting elements are illuminated;

using the gauge to alter the rate of illumination of the lighting elements; and disposing a track proximal to the housing whereby a second user may get a physical sense of the velocity or acceleration chosen by running along the track and trying to keep pace with the rate of illumination of the lighting elements.

* * * * *